(12) United States Patent
Nikovski et al.

(10) Patent No.: US 9,984,334 B2
(45) Date of Patent: May 29, 2018

(54) METHOD FOR ANOMALY DETECTION IN TIME SERIES DATA BASED ON SPECTRAL PARTITIONING

(71) Applicant: Mitsubishi Electric Research Laboratories, Inc., Cambridge, MA (US)

(72) Inventors: Daniel Nikolaev Nikovski, Brookline, MA (US); Andrei Kniazev, Cambridge, MA (US); Michael J. Jones, Belmont, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 918 days.

(21) Appl. No.: 14/305,618

(22) Filed: Jun. 16, 2014

(65) Prior Publication Data

US 2015/0363699 A1   Dec. 17, 2015

(51) Int. Cl.
*G06N 99/00* (2010.01)
(52) U.S. Cl.
CPC .................. *G06N 99/005* (2013.01)
(58) Field of Classification Search
CPC ....................................................... G06N 99/005
See application file for complete search history.

(56) References Cited

U.S. PATENT DOCUMENTS

| 8,073,790 | B2 | 12/2011 | Soetjahja et al. |
| 2006/0247900 | A1 | 11/2006 | Brocklebank et al. |

FOREIGN PATENT DOCUMENTS

| EP | 0765504 A1 | 4/1997 |
| EP | 2477086 A1 | 7/2012 |

OTHER PUBLICATIONS

A Tutorial on Spectral Clustering, by Luxburg, published 2006.*
Spectral Clustering for Time Series, by Wang, published 2005.*
Anton Lebedeviche's Blog, published May 2014, http://mabrek.github.io/blog/statistics-for-monitoring-correlation/.*
Hines, J.W., A. Usynin, and S. Wegerich, "Autoassociative Model Input Variable Selection for Process Modeling", 58th Meeting of the Society for Machinery Failure Prevention Technology, Virginia Beach, Virginia, Apr. 26-30, 2004.
Shi-Malik algorithm (Jianbo Shi and Jitendra Malik, "Normalized Cuts and Image Segmentation", IEEE Transactions on PAMI, vol. 22, No. 8, Aug. 2000.).
Chandola, V., Banerjee, A., and Kumar, V. 2009. Anomaly detection: A survey. ACM Comput. Surv. 41, 3, Article 15 (Jul. 2009).
Hoffman and Buhmann , Pairwise Data Clustering by Deterministic Annealing, IEEE Transactions on Pattern Analysis and Machine Intelligence, vol. 19, No. 1, Jan. 1997.

* cited by examiner

*Primary Examiner* — Paulinho E Smith
(74) *Attorney, Agent, or Firm* — Gene Vinokur; James McAleenan; Hironori Tsukamoto

(57) ABSTRACT

Anomalies in real time series are detected by first determining a similarity matrix of pairwise similarities between pairs of normal time series data. A spectral clustering procedure is applied to the similarity matrix to partition variables representing dimensions of the time series data into mutually exclusive groups. A model of normal behavior is estimated for each group. Then, for the real time series data, an anomaly score is determined, using the model for each group, and the anomaly score is compared to a predetermined threshold to signal the anomaly.

19 Claims, 1 Drawing Sheet

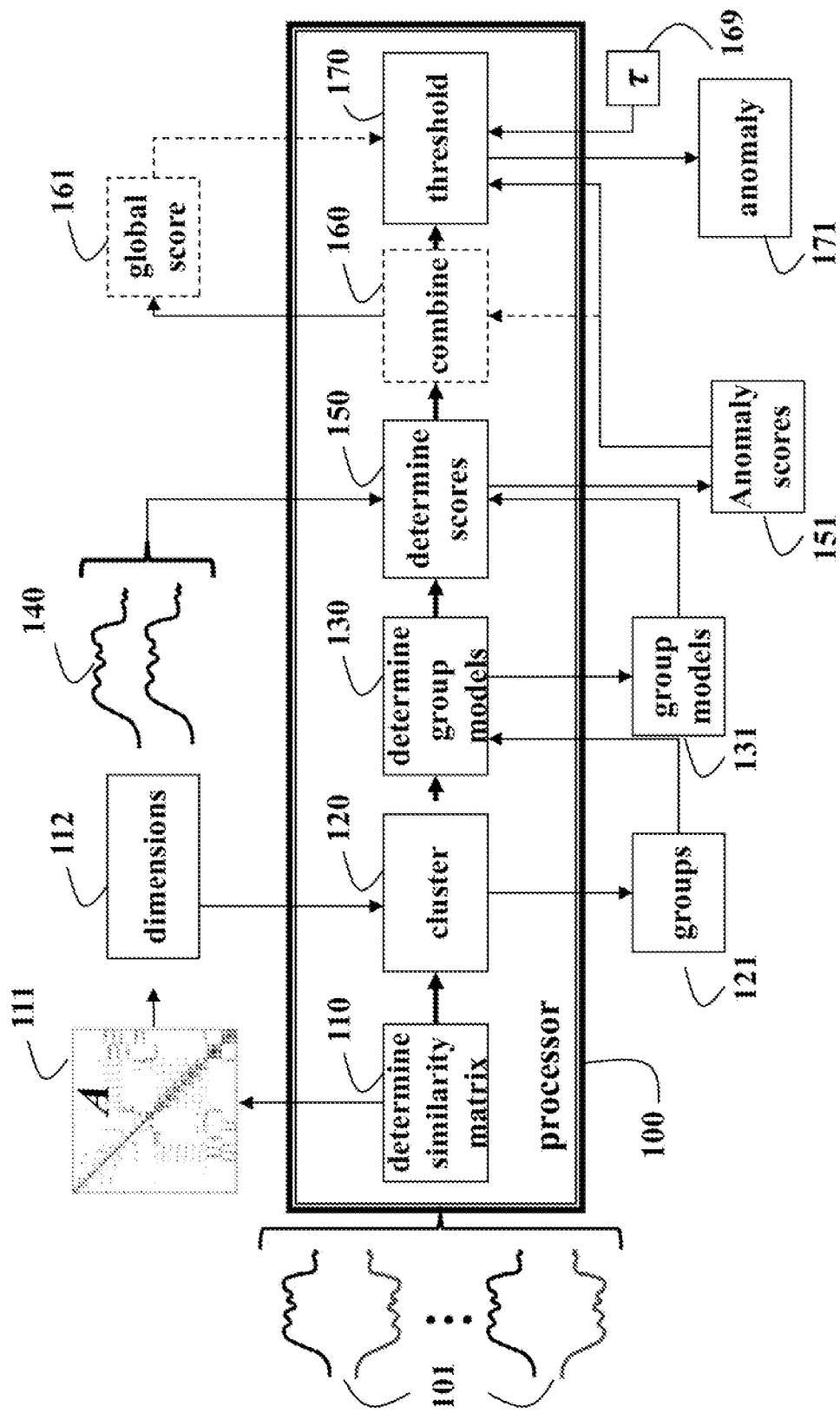

METHOD FOR ANOMALY DETECTION IN TIME SERIES DATA BASED ON SPECTRAL PARTITIONING

RELATED APPLICATION

This U.S. Patent Application is related to MERL-2729, co-filed herewith and incorporated by reference. Both Applications deal with processing data using similarity matrices to form graph Laplacians.

FIELD OF THE INVENTION

The invention relates generally to data analysis of time series data to detect anomalies in the data, and more particularly to large databases storing sensor data acquired from large industrial machines or entire installations of machines by a very large number of sensors.

BACKGROUND OF THE INVENTION

Automated monitoring of conditions of machines and equipment uses methods that process very large streams of sensor data including many individual readings obtained by sampling various sensors at high rates. The rapidly decreasing costs of data acquisition, communication, and storage technologies has made it economically feasible to accumulate vast amounts of data in the form of multivariate time series data, where each component variable) of the time series can be viewed as a separate dimension of an observation vector that is indicative of a state of the system being monitored.

One of the main uses of such data is to automatically detect anomalous conditions that might signify a fault in the system. Such faults can include loose or broken components, incorrect sequence of operations, unusual operating conditions, etc. In most cases, the immediate discovery of such anomalous conditions is very desirable in order to ensure safety, minimize waste of materials, or perform maintenance to avoid catastrophic failures.

One possible way of discovering anomalies is to specify explicitly the conditions that are considered anomalous, in the form of logical rules that describe when a variable is out of its normal range. For some systems, this approach can be very successful, for example when monitoring processes where some parameters such as temperature, pressure, humidity, etc. are actively regulated, and their normal ranges are known.

When such ranges are not available, the normal operating limits may be obtained by means of a data-driven approach, where data variables are measured under normal conditions, and descriptors of the normal operating ranges are extracted from this data. Examples of such descriptors are logical rules, or probability distributions. For example, if x denotes a vector of instantaneous measured variables from the monitored system, and $f(x)$ is a probability density function over the domain of x, which corresponds to the probability that the value x corresponds to normal operation of the system, then this probability density can be evaluated continuously, and an alarm can be signaled when $f(x)$ is less than a predetermined threshold $\tau$.

The question then becomes how to determine a suitable estimate of the probability density function $f(x)$, given a database $X=[x_1, x_2, \ldots x_N]$ of observed data, where $x_t$ is the observation columns vector determined at time t, for $t=1, \ldots N$. The vector $x_t$ includes M variables, such that $x_{i,t}$ is the value of the $i^{th}$ variable at time t, for $i=1, \ldots, M$.

There are many methods for estimating a probability density function over a domain from acquired samples of data points in that domain. Parametric methods make an explicit assumption about, the type of the distribution, and then estimate the parameters of the distribution. For example, if the function is a Gaussian distribution, the parameters are a mean p and a covariance matrix S of the distribution. In this case.

$$\mu = \Sigma^N_{t=1} x_t/N \text{ and } S=(X-\mu)(X-\mu)^T/(N-1),$$

where T is a transpose operator.

When the number of variables M is very large, as is typical for many industrial systems, the resulting estimate is likely to be inaccurate, and inconvenient to use. It might not be very accurate, because the correct probability distribution might be very different from Gaussian distribution. The estimate is likely to be inconvenient for use, because the covariance matrix S, although symmetric, can contain on the order of $M^2$ numbers, and when M is very large, for example numbering in the thousands or millions. Thus, maintaining S in a memory becomes practically unmanageable. Moreover, a full covariance matrix with independent entries cannot be estimated unless the number of readings N is larger than the dimensionality of the data vector M, and at least M+1 of the data points are in general position, i.e., linearly independent.

Whereas other estimation models and methods, such as mixtures of Gaussian distributions can be used to overcome the accuracy problem of a single multivariate Gaussian distribution, those methods still suffer from the problem associated with working with large covariance matrices, which is even worse when more than one Gaussian component is considered.

In contrast to parametric models, non-parametric density estimation methods, such as the Parzen kernel density estimate (PKDE), do not assume a particular parametric form for the distribution, but estimate the density $$f(x)=\Sigma^N_{t=1} K(x-x_t)/N$$

as the sum of individual components, one for each of the acquired data points, via a suitable kernel function K. However, the choice of the kernel function is typically not easy, and that method also needs to retain all N acquired data points in memory, which is problematic when that number is large, and even infinite.

Another common shortcoming of these methods is that they cannot easily handle data of mixed type, for example when some variables are continuous, and others are discrete.

A more efficient approach to dealing with the high dimensionality of the data vector, when the number of data vectors is large, is to try to decompose (factor) the probability distribution $f(x)$ into P individual probability distributions over subsets of the data vector x, such that $$f(x)\Pi^P_{p=1} f_p(x^{(p)}),$$

where $f_p(x^{(p)})$ is a probability density function over the subset $x^{(p)}$ the data vector. Let $\pi_p$ denote the projection operator from x to $x^{(p)}$, that is $x^{(p)}=\pi_p(x)$. Let $V=\{1, 2, \ldots, M\}$ be the set of all indices of data variables, $V_p$ be the set of indices of variables in part p, and $M_p=|V_p|$ be the number of variables in part p. Then, it is desired to obtain a suitable partitioning of V into sets $V_p$, such that $$V\cup^P_{p=1} V_p, \text{ and, correspondingly,}$$

$$M=\Sigma^P_{p=1} M_p.$$

By changing the size of each part, the number of parameters that need to be estimated and stored in memory can be controlled. For example, if Gaussian models are fit to each part, then the covariance matrix for part contains on the order of $M_p^2$ elements. That approach also handles variables of mixed type, where continuous and discrete variables can be put in different parts, and different parametric models can be fit to the parts, for example Gaussian, Bernoulli, and multinomial models.

However, using the smallest possible parts is less effective for the purposes of anomaly detection. A trivial factoring, where each variable is in its own part, such that P=M, $V_P=\{p\}$, $M_P=1$, would indeed result in very compact representation of the probability density, but would fail to capture the dependency between variables, and would not be able to detect so called contextual anomalies. These variables are manifested by readings of one variable that are possible overall, but not when another variable takes on a specific value. For example, the measured air temperature can be 90° F., and this by itself does not necessarily signal anomalous climate, conditions, but if the value of another variable, signifying the calendar month, is set to December, and the measurement location is in the northern hemisphere, then both readings together would clearly signify an anomaly.

Therefore it is desired to determine a partitioning method that has a reasonable balance between the size of the identified parts, the number of points available for the estimation of the individual density functions in each part, and the accuracy of the resulting density.

SUMMARY OF THE INVENTION

The embodiments of the invention provide a method for partitioning of a large set of variables into smaller parts, so that the model of normal behavior over the entire set of variables can be factored into individual models over each part, and the individual part-specific models are easier to estimate, maintain, and use for anomaly detection in time series data. The method uses a spectral clustering method that does not determine explicitly the full covariance matrix over all variables, but relies instead on an efficient eigenvalue solution method for very large eigenvalue problems.

Specifically, anomalies in real time series are detected by first determining a similarity matrix of pairwise similarities between pairs of normal time series data. A spectral clustering procedure is applied, to the similarity matrix to partition variables representing dimensions of the time series data into mutually exclusive groups. A model of normal behavior is estimated for each group. Then, for the real time series data, an anomaly score is determined, using the model for each group, and the anomaly score is compared to a predetermined threshold to signal the anomaly.

BRIEF DESCRIPTION OF THE DRAWINGS

FIG. 1 is a now diagram of a method for detecting an anomaly in real time series data according to embodiments of the inventions.

DETAILED DESCRIPTION OF THE PREFERRED EMBODIMENTS

As shown in FIG. 1, the embodiments of our invention provide a method for detecting an anomaly 171 in real time series data 140. A nonnegative similarity matrix A 111 is determined 110 from pairwise similarities between pairs of dimensions of normal time series data 101. Spectral clustering 120 is applied to the similarity matrix to partition 120 variables representing dimensions 112 of the time series data into groups 121, wherein the groups are mutually exclusive. A model of normal behavior 131 is determined 130 for each group. For the real time series data 140, an anomaly score 151 is determined 150 using the model for each group. Then, the anomaly scores can be compared to a predetermined threshold r 169 to signal the anomaly 171.

Optionally, the individual anomaly scores can be combined 160 to form a global anomaly score 161, and the global anomaly score can be compared to the predetermined threshold τ 169 to signal the anomaly 171.

The steps of the method can be performed in a processor 100 connected to memory and input/output interfaces connected by buses as known in the art.

Now, in greater detail, determining a partitioning of a set of M variables into P parts, according to a particular criterion for optimality, is a very difficult combinatorial optimization problem. The number of possible partitions of a set of M elements is a Bell number $B_M$, which counts the number of partitions of a set, that is very large even for a small M. Exploring exhaustively all possible partitions is clearly impractical, and a more efficient computational procedure is needed.

However, the individual parts should contain variables that are related to each other, that is, variables that need to be taken into consideration, when trying to detect contextual anomalies. This relation can stem from a close physical origin, for example, temperature and pressure acquired from the same machine are likely to be related, due to the physical laws operating on the same substance in that machine, gas, liquid, air, etc., but temperatures and pressures from different machines are likely to be only connected weakly. A useful approach is to cluster variables based on some similarity measure.

A natural candidate for the similarity measure between a pair of variables is a correlation coefficient. Another, related, similarity measure is a coefficient of determination of one variable from the other, assuming some form of dependency between the two variables. This dependency can be linear, in which case the coefficient of determination is equal to the correlation coefficient, but can also be non-linear, such as polynomial, neural, or a radial-basis function network, support vector machine (SVM), etc. The similarity between variable i and variable J is $b_{ij}$.

Our Method tries to find a grouping of the M variables into P groups, such that the similarity between variables in the same group is maximized, and the similarity between variables in different groups is minimized. It can be noticed that this objective is shared with a large class of procedures, known as clustering procedures. Our idea is then to apply a scalable procedure for pairwise clustering to a suitable matrix of similarity values.

It should be noted that not all clustering procedures are suitable for this purpose. Many procedures assume that the objects to be clustered are embedded into an Euclidean space. However, in our case, the individual variables are not embedded into such a space. Although the individual data points $x_t$ in the acquired data set are embedded into an M-dimensional Euclidean space, our approach is not to cluster the data points, but instead, to cluster the variables that represent the dimensions of the M-dimensional Euclidean space.

Nevertheless, suitable procedures for clustering with pairwise similarity values do exist. For example, one procedure for pairwise clustering is based on deterministic annealing. However, most of these procedures do require the entire similarity matrix to be present in memory, which is one of the main limitations of the methods that fit multivariate probability density functions (pdfs), e.g., Gaussian mixture of Gaussian distributions, or non-parametric Parzen kernel density estimate.

To resolve this limitation, we use a spectral clustering procedure 120 based on fast eigenvalue analysis.

This method uses the nonnegative symmetric similarity matrix A to form the graph Laplacian L=D−A of a graph whose M vertices correspond to the individual variables in the problem domain, and the edges between two variables i and j have weight $a_{ij}$. Because the similarity values $b_{ij}$ between pairs of variable i and j are not necessarily symmetric, we use the matrix A with $a_{ij}=(b_{ij}+b_{ji})/2$.

Spectral clustering is performed by finding a smallest non-zero eigenvalue of L, where the first value is always trivially zero. After the smallest non-zero eigenvalue is found, groups are determined by projecting all points (variables) on the corresponding eigenvector, and clustering the variables with the same sign of the projection into the same groups according to a normalized cuts or Shi-Malik procedure. This procedure can be repeated, or the values of the projection can be clustered into more than two groups using another clustering algorithm, a k-means clustering.

The key to the efficiency of this procedure is the fast determination of the first few eigenvalues of the matrix L. This can be done by a Block Locally Optimal Preconditioned Eigenvalue Xolvers (BLOPEX) that includes an eigensolver implemented with a Locally Optimal Block Preconditioned Conjugate Gradient method (LOBPCG). The LOBPCG method does not need the entire matrix loaded in memory, but only needs the results from multiplying the matrix a given vector. This characteristic of the method makes it applicable to eigenanalysis problems of very high dimensions, and eliminates the need to store the entire similarity matrix in memory, thus resulting in scalability to very large values of M.

After the set of all variables has been partitioned into variables, individual models for normal behavior for each of the groups can be estimated independently of each other. One possible representation for the model of group p is a multivariate Gaussian pdf $f_p(\ )$ over all variables in group p, represented by a mean vector $\mu_p$ and a covariance matrix $S_p$. Then, when a new data point x becomes available, the anomaly score $s_p$ for a group p is computed as the probability that the projection $\pi_p(x)$ of the data point over the variables in group p could be generated from the estimated pdf $f_p(\ )$:

$$s_p = f_p[\pi_p(x)].$$

After all scores $s_p$ have been computed for each group p=1, . . . , P, the scores can optionally be combined either by simply adding the scores up, or forming a weighted combination, where each score is weighted by the number of variables in the corresponding group, or by means of a general logical expression on the individual scores. For, example, the logical expression can be composed by means of logical operators AND and OR over individual logical conditions on the scores against group-specific thresholds, i.e., over scores $s_p$ of the type $s_p > \theta_p$, where $\theta_p$ is an individual threshold for group p. The effect of using this logical expression is that an anomaly is detected any time even when one of the individual anomaly scores is greater than respective threshold.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting an anomaly in multivariate time series, comprising the steps of:
   determining a similarity matrix of nonnegative pairwise similarities between pairs of normal univariate time series data each of which corresponds to a variable representing a dimension of the multivariate time series data;
   applying a spectral clustering procedure to the similarity matrix in order to transform the similarity matrix into a block diagonal form, by partitioning the variables representing dimensions of the multivariate time series data into groups, wherein the groups are mutually exclusive;
   estimating a probability density model of normal behavior for each group and defining a factored probability distribution model over an entire multivariate time series as a product of the probability densities over each group;
   determining, for the multivariate time series data, an anomaly score using the probability density model of normal behavior for each group; and
   comparing the anomaly score to a predetermined threshold to signal the anomaly, wherein the steps are performed in a processor.

2. The method of claim 1, wherein the multivariate time series data are acquired by at least one sensor.

3. The method of claim 1, wherein the spectral clustering uses an absolute value of a correlation coefficient as a similarity measure.

4. The method of claim 3, wherein the correlation coefficient is linear, non-linear, an output of a radial-basis function network, or a support vector machine.

5. The method of claim 1, wherein the spectral clustering maximizes a similarity between variables in the same group, and minimizes the similarity between elements in different groups.

6. The method of claim 1, wherein the dimensions are of an M-dimensional Euclidean space.

7. The method of claim 1, wherein the spectral clustering uses a normalized cuts procedure.

8. The method of claim 3, wherein the similarity measure $b_{ij}$ between pairs of variables i and j is not necessarily symmetric, and the similarity matrix is A with $a_{ij}=(b_{ij}+b_{ji})/2$.

9. The method of claim 1, wherein the model of each group is represented by a probability density function over the variables in the group.

10. The method of claim 9, wherein the probability density function is a multivariate Gaussian distribution.

11. The method of claim 9, wherein the probability density function is a non-parametric Parzen kernel density estimate.

12. The method of claim 1, further comprising:
    combining the anomaly scores to form a global anomaly score; and
    comparing the global anomaly score to the predetermined threshold to signal the anomaly.

13. The method of claim 12, wherein combining uses a general logical expression.

14. The method of claim 13, wherein the logical expression is composed by means of logical operators AND and OR over logical conditions on the scores against group-specific thresholds.

15. The method of claim 1, wherein the defining the factored probability distribution model over the entire multivariate time series as the product of the probability densities over each group includes representing the factor probability distribution model as $$f(x) = \prod_{p=1}^{P} f_p(x^{(p)}),$$

wherein $f(x)$ is the probability density of the entire multivariate time series, and $f_p(x^{(p)})$ is the probability density over the group p.

16. The method of claim 1, wherein the normal univariate time series data is data gathered from a sensor in communication with a machine, such that the data gathered during a time the machine is operating is as the machine's intended operation without anomalies or malfunctions.

17. A system for detecting an anomaly in multivariate time series, comprising:
at least one sensor in communication with a machine;
a memory to store and provide multivariate time series data generated by the at least one sensor in communication with the machine;
a processor in communication with the memory, is configured to:
determine a similarity matrix of nonnegative pairwise similarities between pairs of normal univariate time series data, each of which, corresponds to a variable representing a dimension of the multivariate time series data;
apply a spectral clustering procedure to the similarity matrix in order to transform the similarity matrix into a block diagonal form, by partitioning the variables representing dimensions of the multivariate time series data into groups, wherein the groups are mutually exclusive;
estimate a probability density model of normal behavior for each group and defining a factored probability distribution model over an entire multivariate time series as a product of the probability densities over each group;
determine, for the multivariate time series data, an anomaly score using the probability density model of normal behavior for each group;
compare the anomaly score to a predetermined threshold to signal the anomaly; and
store the signaled anomaly in the memory, wherein the signaled anomaly is a predictive estimate of an impending failure and assists in management of the machine.

18. A method for detecting an anomaly in multivariate time series, comprising the steps of:
determining a similarity matrix of nonnegative pairwise similarities between pairs of normal univariate time series data each of which corresponds to a variable representing a dimension of the multivariate time series data;
applying a spectral clustering procedure to the similarity matrix in order to transform the similarity matrix into a block diagonal form, by partitioning the variables representing dimensions of the multivariate time series data into groups, wherein the groups are mutually exclusive;
estimating a probability density model of normal behavior for each group and defining a factored probability distribution model over an entire multivariate time series as a product of the probability densities over each group;
determining, for the multivariate time series data, an anomaly score using the probability density model of normal behavior for each group;
combining the anomaly scores to form a global anomaly score;
comparing the global anomaly score to the predetermined threshold to signal the anomaly; and
outputting the signaled anomaly via an output interface in communication with the processor, wherein the steps are performed in a processor.

19. A method for detecting an anomaly in multivariate time series, comprising the steps of:
determining a similarity matrix of nonnegative pairwise similarities between pairs of normal univariate time series data each of which corresponds to a variable representing a dimension of the multivariate time series data;
applying a spectral clustering procedure to the similarity matrix in order to transform the similarity matrix into a block diagonal form, by partitioning the variables representing dimensions of the multivariate time series data into groups, wherein the groups are mutually exclusive;
estimating a probability density model of normal behavior for each group and defining a factored probability distribution model over an entire multivariate time series as a product of the probability densities over each group;
determining, for the multivariate time series data, an anomaly score using the probability density model of normal behavior for each group;
combining the anomaly scores to form a global anomaly score;
comparing the global anomaly score to the predetermined threshold to signal the anomaly, wherein the combining is a weighted addition, with weights proportional to a number of variables of each group; and
outputting the signaled anomaly via an output interface in communication with the processor, wherein the steps are performed in a processor.

* * * * *